(12) United States Patent
Hosoe et al.

(10) Patent No.: US 8,394,738 B2
(45) Date of Patent: *Mar. 12, 2013

(54) HYDROGEN STORAGE MATERIAL AND METHOD FOR PRODUCING THE SAME

(75) Inventors: Mitsuya Hosoe, Wako (JP); Izuru Kanoya, Wako (JP); Terumi Furuta, Wako (JP); Hiroshi Sakai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 190 days.

This patent is subject to a terminal disclaimer.

(21) Appl. No.: 12/974,264

(22) Filed: Dec. 21, 2010

(65) Prior Publication Data

US 2011/0160051 A1 Jun. 30, 2011
US 2012/0040825 A9 Feb. 16, 2012

(30) Foreign Application Priority Data

Dec. 28, 2009 (JP) .................................. 2009-297861

(51) Int. Cl.
*B01J 20/02* (2006.01)
*C01B 3/06* (2006.01)
*C01B 3/08* (2006.01)

(52) U.S. Cl. ..................... 502/406; 420/900; 423/658.2; 502/414

(58) Field of Classification Search .................. 502/414, 502/406; 420/900; 423/648.1, 658.2
See application file for complete search history.

(56) References Cited

U.S. PATENT DOCUMENTS

| | | | |
|---|---|---|---|
| 2003/0157018 A1* | 8/2003 | Zaluski et al. | 423/648.1 |
| 2005/0164878 A1 | 7/2005 | Morioka et al. | |
| 2005/0191235 A1* | 9/2005 | Vajo et al. | 423/657 |
| 2009/0025509 A1 | 1/2009 | Shinozawa et al. | |

FOREIGN PATENT DOCUMENTS

| | | |
|---|---|---|
| JP | 2004-18980 A | 1/2004 |
| JP | 2008-266781 A | 11/2008 |
| JP | 2009-30125 A | 2/2009 |

OTHER PUBLICATIONS

Konovalov, S. K. and Bulychev, B. M., "The P,T-State Diagram and Solid Phase Synthesis of Aluminium Hydride," Inorg. Chem. 1995, vol. 34, pp. 172-175, American Chemical Society, Washington, DC.

* cited by examiner

*Primary Examiner* — Wayne Langel
*Assistant Examiner* — Syed Iqbal
(74) *Attorney, Agent, or Firm* — Capitol City TechLaw, PLLC

(57) ABSTRACT

A mixed powder of $AlH_3$ and $MgH_2$ is ball-milled in a hydrogen atmosphere while applying force of 5 G through 30 G (in which G is gravitational acceleration), and the thus-obtained milled product is dehydrogenated to produce a hydrogen storage material. The hydrogen storage material comprises an amorphous phase containing an Al—Mg alloy as a mother phase, and a crystalline Al phase having a maximum length of 100 nm or less, the crystalline Al phase being distributed as a dispersed phase in the mother phase.

8 Claims, 16 Drawing Sheets (GRAY PORTION)

(BLACK PORTION)

(GRAY PORTION)

(BLACK PORTION a)

(BLACK PORTION b)

HYDROGEN STORAGE MATERIAL AND METHOD FOR PRODUCING THE SAME

CROSS-REFERENCE TO RELATED APPLICATION

This application is based upon and claims the benefit of priority from Japanese Patent Application No. 2009-297861 filed on Dec. 28, 2009, of which the contents are incorporated herein by reference.

BACKGROUND OF THE INVENTION

1. Field of the Invention

The present invention relates to a hydrogen storage material capable of reversibly storing and releasing hydrogen, and a method for producing the same.

2. Description of the Related Art

Fuel-cell cars are equipped with fuel cells for generating electric power utilizing an electrochemical reaction between hydrogen and oxygen. Thus, a motor of the fuel-cell car is actuated by the electric power from the fuel cell to generate driving force for rotating wheels.

The oxygen can be obtained from the air, and the hydrogen is generally supplied from a hydrogen storage vessel. Therefore, the fuel-cell car is further equipped with the hydrogen storage vessel.

As the hydrogen storage vessel has a higher hydrogen storage capacity, the fuel-cell car can be driven over a longer distance. However, when the fuel-cell car contains an excessively large gas storage vessel, the weight of the fuel cell car is increased, resulting in a higher load on the fuel cell disadvantageously. From this viewpoint, various techniques have been studied in order to acquire a hydrogen storage vessel having a high hydrogen storage capacity with a small volume. In one of these techniques, a hydrogen storage material is placed inside the hydrogen storage vessel. For example, in Japanese Laid-Open Patent Publication No. 2004-018980, $AlH_3$, which can store a great amount of hydrogen, i.e., 10% by weight of its own weight, is reported as an effective hydrogen storage material.

As shown in FIG. 16, a crystalline $AlH_3$ 1 has a microstructure containing matrix phases 2 approximated by squares and a grain boundary phase 3 disposed between the matrix phases 2, 2. In this case, the matrix phases 2 have a side length t1 of approximately 100 μm, and the grain boundary phase 3 has a width w1 of several micrometers and occupies only a several volume percent of the structure. In an X-ray diffraction measurement of the crystalline $AlH_3$, sharp peaks of at least one of α, β, and γ phases can be observed in the diffraction pattern.

It should be noted that the matrix phases 2 are composed of $AlH_3$ having a crystal lattice containing Al and H, and the grain boundary phase 3 is composed of a solid solution of H in an amorphous Al.

In the crystalline $AlH_3$ 1, hydrogen is stored in accordance with the following formula (1), while the stored hydrogen is released in accordance with the formula (2). The formulae (1) and (2) represent reactions at an arbitrary storage/release site, and do not mean that all sites of the crystalline $AlH_3$ 1 are oxidized and reduced.

$$Al + 3/2 H_2 \rightarrow AlH_3 \quad (1)$$

$$AlH_3 \rightarrow Al + 3/2 H_2 \quad (2)$$

It is known that the release reaction represented by the formula (2) can relatively readily proceed, but the storage reaction represented by the formula (1) cannot readily proceed. For example, as described in Japanese Laid-Open Patent Publication No. 2004-018980, hydrogen gas can be stored again (re-stored) when the $AlH_3$ is doped with Ti and NaH and then ball-milled under a hydrogen pressure of 100 atm.

In addition, as described in Sergei K. Konovalov and Boris M. Bulychev, Inorganic Chemistry, 1995, 34, pp 172-175 (particularly page 173, right column, lines 26-28 and FIG. 2), when Al is hydrogenated by $H_2$ gas contact in a gas-phase process, the hydrogenation has to be carried out under a higher pressure of more than 2.5 GPa (about 25000 atm) at 280° C. through 300° C. or under a further higher pressure of 4 through 6 GPa at 450° C. through 550° C.

As described above, the crystalline $AlH_3$ is disadvantageous in that it cannot readily store the hydrogen.

SUMMARY OF THE INVENTION

A general object of the present invention is to provide a hydrogen storage material capable of readily storing and releasing hydrogen.

A principal object of the present invention is to provide a hydrogen storage material having a high hydrogen storage capacity.

Another object of the present invention is to provide a method for producing the hydrogen storage material.

According to an aspect of the present invention, there is provided a hydrogen storage material capable of reversibly storing and releasing hydrogen, comprising an amorphous phase containing an Al—Mg alloy and a crystalline Al phase having a maximum length of 100 nm or less, the crystalline Al phase being dispersed in the amorphous phase.

The hydrogen storage material having such a structure can exhibit a high hydrogen storage capacity even under a relatively mild condition. In other words, the hydrogen storage material requires only a low energy for storing hydrogen. In fact, in the hydrogen storage material of the present invention, hydrogen storage is started at a pressure of approximately 10 MPa (100 atm) and a temperature of approximately 100° C. In addition, the hydrogen storage material can release hydrogen under this condition.

This is considered to be because the amorphous phase has a volume larger than volumes of the other phases (i.e., the amorphous phase is used as a mother phase). When hydrogen is stored in the crystalline $AlH_3$ (see FIG. 16), hydrogen storage is started in the amorphous grain boundary phase as described above. Similarly, in the hydrogen storage material of the present invention, if it is assumed that the hydrogen storage is preferentially caused in the amorphous phase, it is presumed that the hydrogen storage material can exhibit a high hydrogen storage capacity even under the relatively mild condition, because the amorphous phase is the mother phase (i.e., because the amorphous phase has a volume larger than volumes of the other phases).

Thus, the hydrogen storage material of the present invention can exhibit a high hydrogen storage capacity even under low temperature and low pressure. Therefore, in a gas storage vessel containing the hydrogen storage material, it is unnecessary to provide a heating device or a particular structure for improving the pressure resistance. As a result, the structure of the gas storage vessel can be simplified to avoid the increased equipment investment.

In addition, adsorption of hydrogen molecules, dissociation of the adsorbed hydrogen molecules to hydrogen atoms, and diffusion of the dissociated hydrogen atoms into the amorphous phase are accelerated due to the presence of Mg in the hydrogen storage material of the present invention, as compared with materials using only Al. Thus, the Mg also increases the hydrogen storage capacity.

When a metal particle having a maximum diameter of 500 nm or less is dispersed in the amorphous phase, the above effect can be enhanced, so that the hydrogen storage capacity can be increased under an identical condition. This is considered to be because the metal particle has an activity for storing hydrogen.

The metal particle may contain any component as long as it can show the above activity. Preferred examples of the components include Ni, Fe, Pd and combinations of two or more thereof.

According to another aspect of the present invention, there is provided a method for producing a hydrogen storage material comprising an amorphous phase containing an Al—Mg alloy and a crystalline Al phase having a maximum length of 100 nm or less, the crystalline Al phase being dispersed in the amorphous phase, the method comprising the steps of mixing $AlH_3$ and $MgH_2$ to prepare a mixed powder, ball-milling the mixed powder in a hydrogen atmosphere for 60 through 600 minutes while applying force of 5 G through 30 G (in which G is gravitational acceleration) to prepare a milled product, and dehydrogenating the milled product to obtain the hydrogen storage material.

In the present invention, a great force of 5 G through 30 G is applied to the mixed powder of the $AlH_3$ and $MgH_2$ in the ball milling step. By applying the force, the matrix structure of the $AlH_3$ and $MgH_2$ is converted to the amorphous Al—Mg alloy phase, and the crystalline Al phase having a maximum length of 100 nm or less is distributed as a dispersed phase in the amorphous phase, to obtain the milled product.

Thus, in the present invention, by ball-milling the mixed powder under the force, it is possible to obtain the hydrogen storage material capable of storing a large amount of hydrogen even under a relatively mild condition.

The ratio between the $AlH_3$ and $MgH_2$ in the mixed powder is not particularly limited. For example, the weight ratio of the $AlH_3$ to the $MgH_2$ may be 55:45 through 95:5.

As described above, when the metal particle having a maximum diameter of 500 nm or less is dispersed in the amorphous phase (the mother phase), the hydrogen storage capacity can be increased under an identical condition. In this case, the metal particle having a maximum diameter of 500 nm or less may be further added in the step of mixing the $AlH_3$ and $MgH_2$. Of course, the $AlH_3$, $MgH_2$ and metal particle may be mixed in random order.

In this case, the metal particle preferably contains Ni, Fe, Pd or two or more thereof. As described above, the components are excellent in the effect of increasing the hydrogen storage capacity.

In the case of adding the metal particle, the ratio between the $AlH_3$, $MgH_2$ and metal particle in the mixed powder is not particularly limited. For example, the weight ratio of the $AlH_3$ to the total of the $MgH_2$ and the metal particle may be 55:45 through 95:5.

The above and other objects features and advantages of the present invention will become more apparent from the following description when taken in conjunction with the accompanying drawings in which preferred embodiments of the present invention is shown by way of illustrative example.

DESCRIPTION OF THE PREFERRED EMBODIMENTS

Several preferred embodiments of a hydrogen storage material and a production method thereof according to the present invention will be described in detail below with reference to the accompanying drawings.

Figure 1:
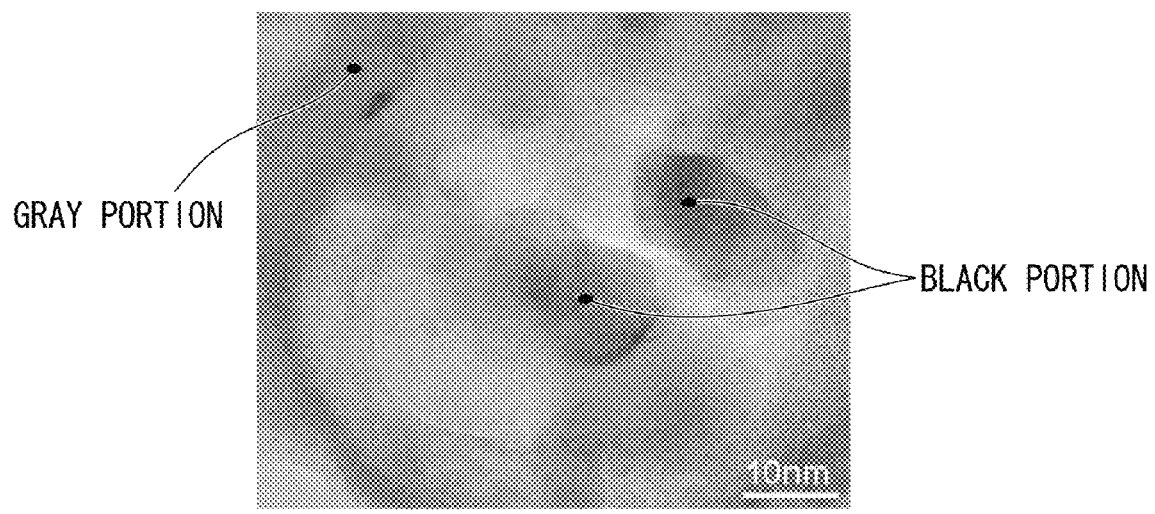
FIG. 1 is a transmission electron microscope (TEM) photograph of a hydrogen storage material according to an embodiment of the present invention.

FIG. 1 is a transmission electron microscope (TEM) photograph of a hydrogen storage material according to an embodiment of the present invention. As shown in FIG. 1, in the TEM analysis, most of the hydrogen storage material is composed of a gray portion, and point-like black portions are distributed in the gray portion. The gray portion is a mother phase, and the black portions are dispersed phases.

Figure 2:
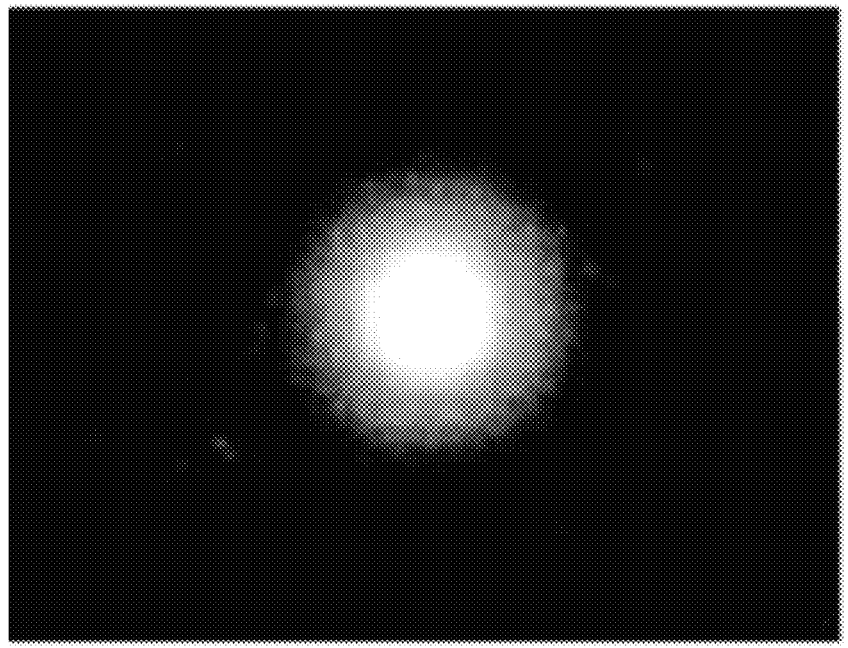
FIG. 2 is an electron beam diffraction image obtained by a selected-area analysis of a gray portion shown in FIG. 1.

FIG. 2 is an electron beam diffraction image obtained by a selected-area analysis of the gray portion. A halo pattern is shown in FIG. 2, so that the gray portion is an amorphous phase. Furthermore, in an energy dispersive X-ray spectroscopy (EDS), the presence of Al and Mg are confirmed in the gray portion. As made clear from the above results, the gray portion (i.e., the mother phase) is composed of an amorphous phase containing an Al—Mg alloy.

Figure 3:
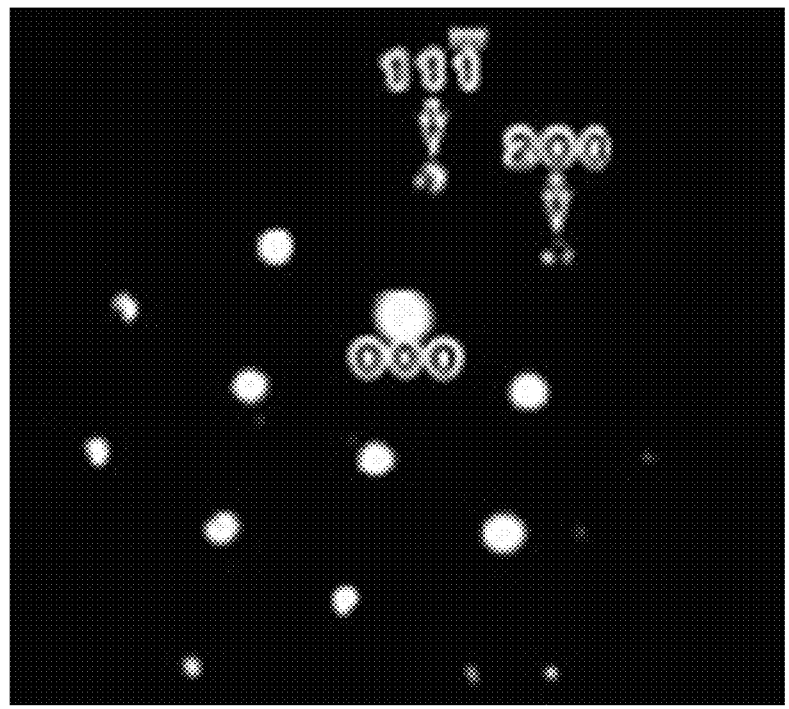
FIG. 3 is an electron beam diffraction image obtained by a selected-area analysis of a black portion shown in FIG. 1.

On the other hand, as shown in FIG. 3, in a selected-area analysis of the black portion, a clear spot pattern indicating a crystalline substance is observed. Furthermore, in an EDS analysis, the presence of Al is confirmed. Thus, the black portions (i.e., the dispersed phases) are composed of crystalline Al phases.

Figure 4:
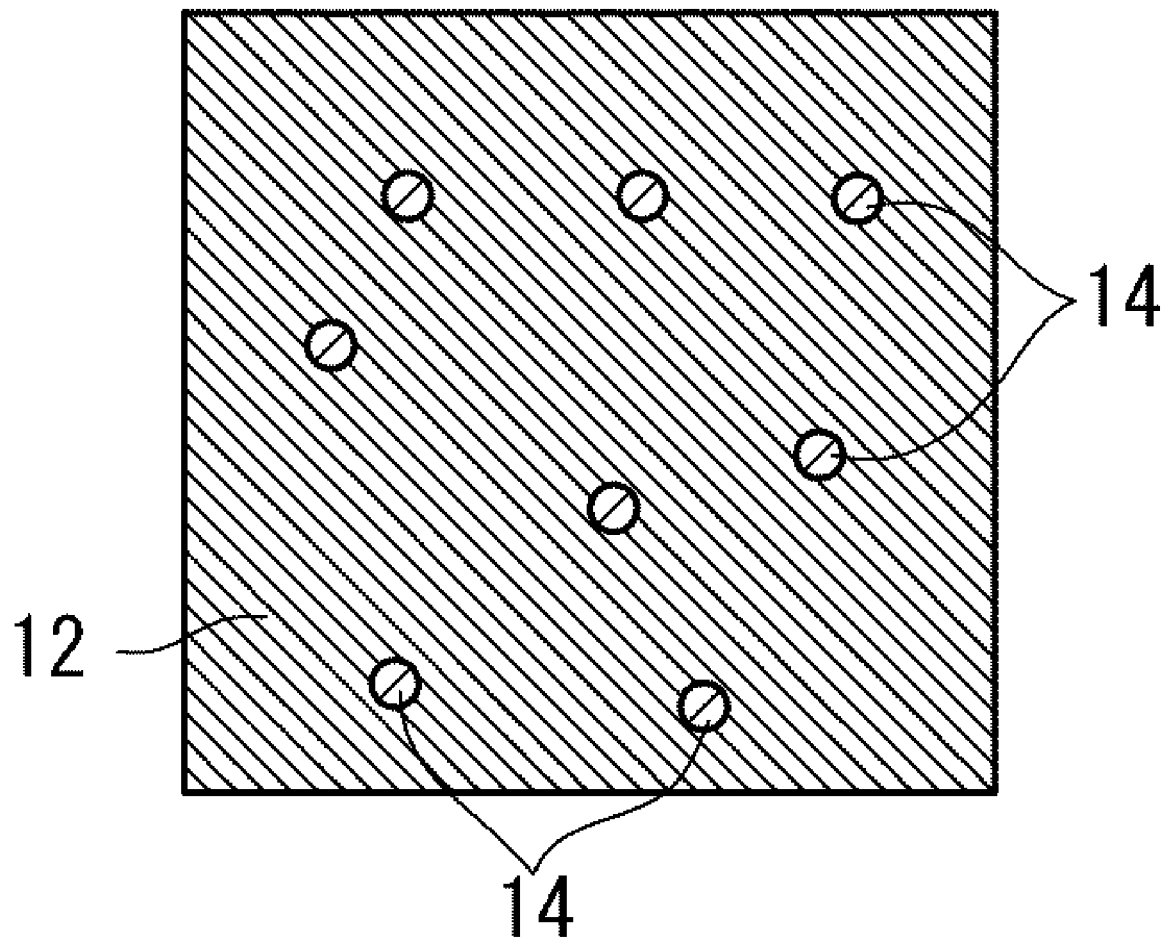
FIG. 4 is a schematic explanatory view showing a microstructure of the hydrogen storage material shown in FIGS. 1 to 3.

FIG. 4 is a schematic explanatory view showing a microstructure of the hydrogen storage material 10 having the gray portion (the mother phase) and the black portions (the dispersed phases) shown in the above electron beam diffraction images. In FIG. 4, referential numbers 12 and 14 represent the mother phase and the dispersed phases respectively.

As described above, when hydrogen is stored in the crystalline $AlH_3$ 1 (see FIG. 16), the hydrogen storage is started in the amorphous grain boundary phase 3. Also in the hydrogen storage material 10 of this embodiment, the hydrogen storage is considered to be started in the amorphous mother phase 12.

As is clear from FIGS. 1 and 4, in the hydrogen storage material 10 of this embodiment, the amorphous mother phase 12 has a remarkably high volume ratio. Therefore, the hydrogen storage material 10 has a large number of hydrogen storage sites, and thus has a significantly high hydrogen storage capacity.

In the mother phase 12, Al and Mg are randomly distributed. Thus, energy required for hydrogenating Al in many of the hydrogen storage sites is lower than energy required for hydrogenating Al into a crystalline $AlH_3$ in a gas-phase process. Therefore, energy required for storing hydrogen in the mother phase 12 can be lower than that in the crystalline $AlH_3$. Thus, the hydrogen storage material 10 can readily store hydrogen.

Furthermore, the mother phase 12 contains Mg. The amorphous phase containing the Al—Mg alloy can adsorb hydrogen molecules more readily than an amorphous phase containing only Al. In addition, the amorphous phase containing Al—Mg alloy is more excellent in the dissociation of hydrogen molecules into hydrogen atoms and the diffusion of the dissociated hydrogen atoms to the inside. Thus, the process from the hydrogen adsorption onto the mother phase 12 to the hydrogen incorporation (storage) is accelerated due to the presence of Mg.

Figure 16:
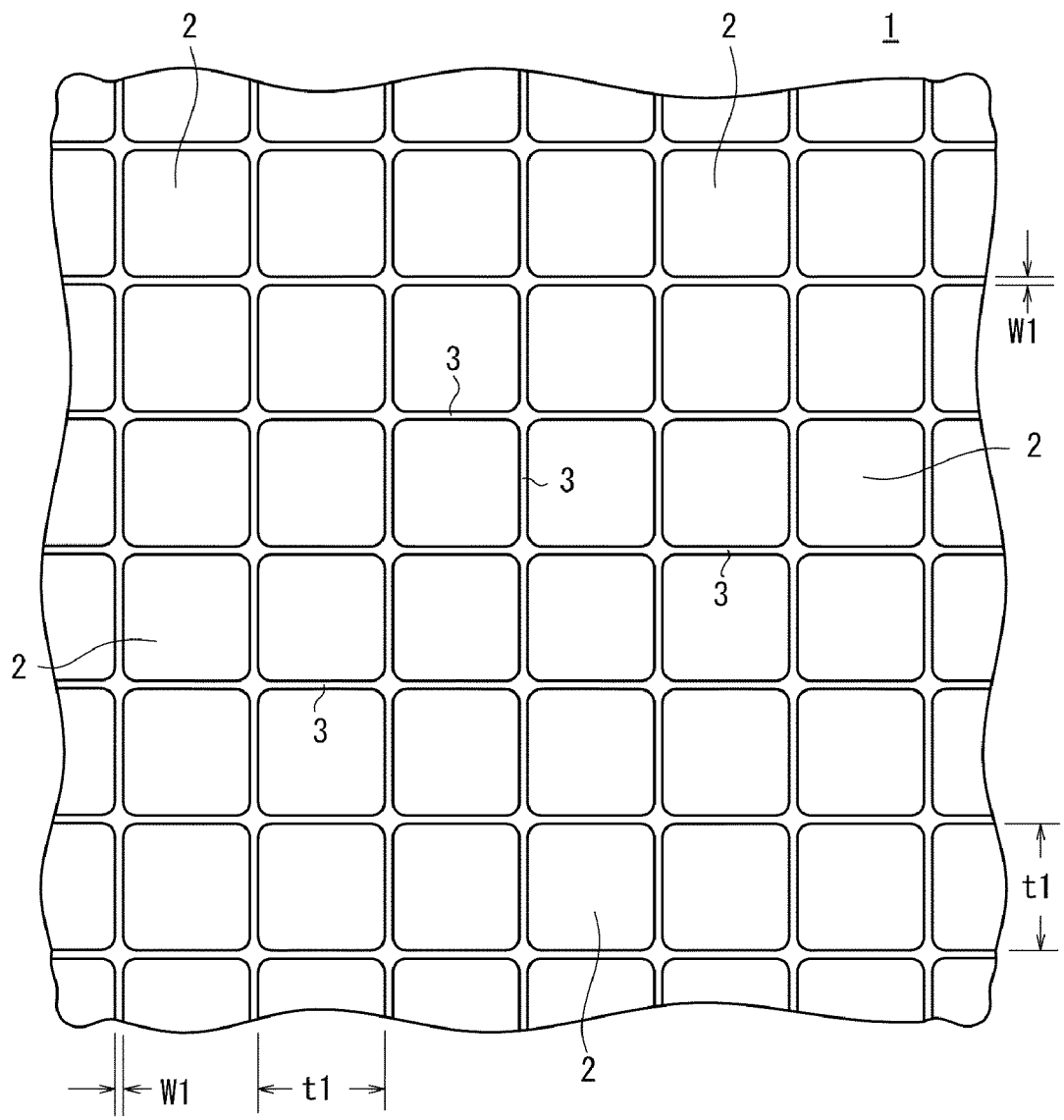
FIG. 16 is a schematic explanatory view showing a microstructure of a crystalline $AlH_3$.

For the above reasons, the hydrogen storage material 10 can store a larger amount of hydrogen even under a relatively mild condition at a hydrogen pressure of approximately 10 MPa (100 atm) and a temperature of approximately 100° C. as compared with the crystalline $AlH_3$ 1 shown in FIG. 16. In addition, it is unnecessary to subject the hydrogen storage material 10 to a ball milling process for storing hydrogen.

The dispersed crystalline Al phases have a maximum length of 100 nm or less. In other words, the hydrogen storage material 10 does not contain a dispersed phase having a length of more than 100 nm, which is measured in a two-dimensional plane.

The hydrogen storage material 10 may be produced as follows.

$AlH_3$ is synthesized first.

For example, $AlH_3$ is obtained by dissolving $AlCl_3$ in a diethyl ether solution of $LiAlH_4$ to carry out a reaction therebetween at ambient temperature. LiCl generated in the reaction is removed by filtration, and the filtrate is exposed to reduced pressure using a vacuum pump or the like at room temperature to evaporate diethyl ether. Then, the residue is dried under reduced pressure at 40° C. through 80° C. to obtain a solid powder of $AlH_3$. At this point, the $AlH_3$ is composed of a crystalline $AlH_3$.

Then, the $AlH_3$ is mixed with $MgH_2$ powder to prepare a mixed powder. The $MgH_2$ powder is easily commercially available from Furuuchi Chemical Corporation, etc.

The ratio between the $AlH_3$ and $MgH_2$ is not particularly limited. The weight ratio of the $AlH_3$ to the $MgH_2$ may be 55:45 through 95:5.

The mixed powder is ball-milled in a hydrogen gas atmosphere while applying a force of 5 G through 30 G (in which G is gravitational acceleration). Specifically, the mixed powder is enclosed in a pot together with a crushing ball in the hydrogen atmosphere such that the internal hydrogen pressure of the pot is 0.1 through 2 MPa.

Then, the pot is placed on a disc-shaped base plate of a planetary ball milling apparatus, and fixed between a rotatable table and a press shaft. The disc-shaped base plate and the rotatable table are both rotated.

In the planetary ball milling apparatus, the pot is in orbital motion by rotation of the disc-shaped base plate and rotated on its axis by rotation of the rotatable table. Thus, the pot revolves orbitally around a rotary shaft connected to the disc-shaped base plate, and is rotated on its axis around the press shaft. The force is applied to the mixed powder in the pot by the orbital motion and the axis motion. The inside of the pot is kept under the hydrogen atmosphere during the ball milling, so that generation of an undesired compound such as magnesium alanate $Mg(AlH_4)_2$ is prevented, whereby the amorphous phase containing Al—Mg alloy is obtained.

The force of 5 G through 30 G can be applied by controlling the rotation speed of the disc-shaped base plate or the rotatable table, the treatment time, etc. For example, when the pot has a diameter of 80 mm, a height of 100 mm, and an internal volume of 80 ml, and the disc-shaped base plate has a diameter of about 300 mm, the rotation speed of the disc-shaped base plate (the orbital motion) may be 50 through 500 rpm, the rotation speed of the rotatable table (the axis motion) may be 30 through 1000 rpm, and both of the orbital motion and the axis motion may be carried out for 60 through 600 minutes.

As described above, in this embodiment, a high energy is applied to the crystalline $AlH_3$ and $MgH_2$. As a result, the matrix structure of the crystalline $AlH_3$ and $MgH_2$ is converted to the amorphous phase containing the Al—Mg alloy, and the crystalline Al phases having a maximum length of 100 nm or less are distributed as the dispersed phases in the amorphous phase, thereby obtaining a milled product.

When the force applied in the ball milling is less than 5 G (i.e., the milling time is less than 60 minutes under the above condition), the microstructure cannot be satisfactorily formed. On the other hand, when the force is more than 30 G (the milling time is more than 600 minutes under the above condition), the amorphous phase is readily converted to a crystalline phase, so that the mother phase 12 may contain a large amount of the crystalline phase needing a high hydrogen storage energy.

Then, the milled product is subjected to a dehydrogenation treatment to form the hydrogen storage sites, whereby the hydrogen storage material 10 shown in FIGS. 1 to 4 is obtained. In an X-ray diffraction measurement of the hydrogen storage material 10, peaks of Al and a broad pattern of the amorphous phase are observed.

Figure 5:
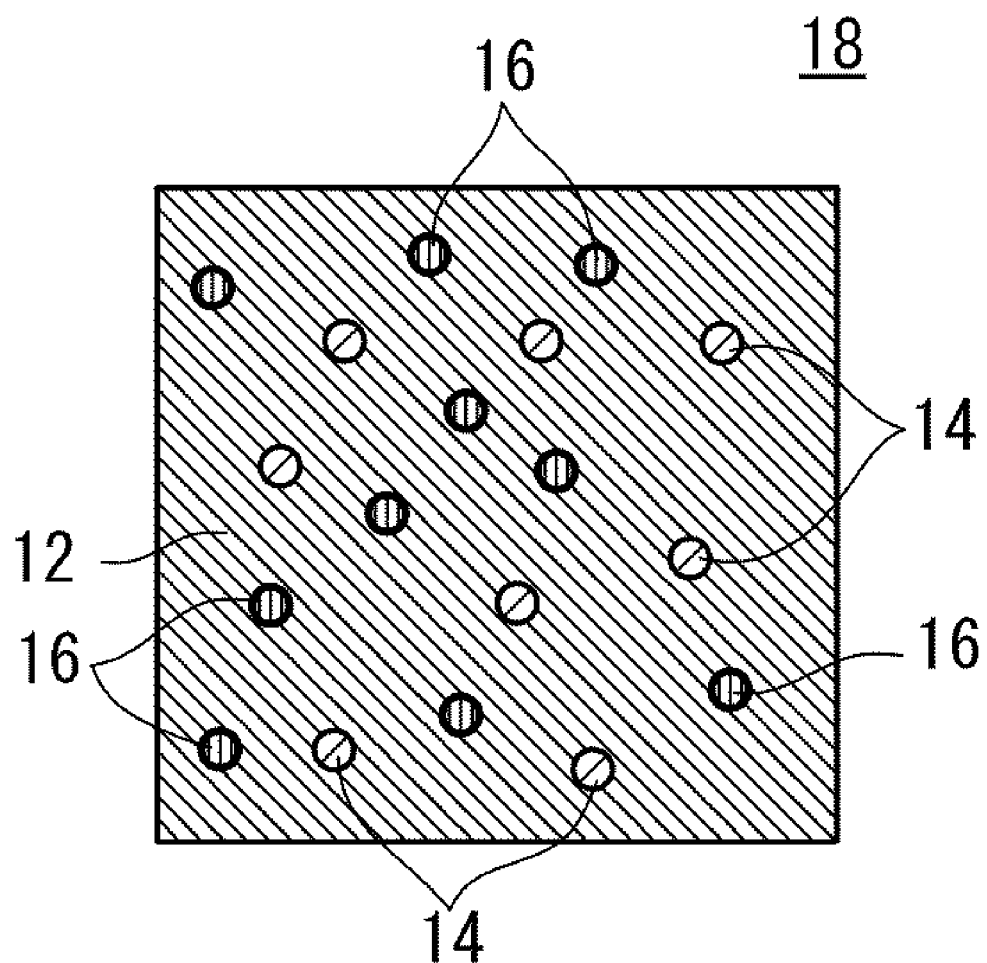
FIG. 5 is a schematic explanatory view showing a microstructure of a hydrogen storage material according to another embodiment of the present invention.
Figure 6:
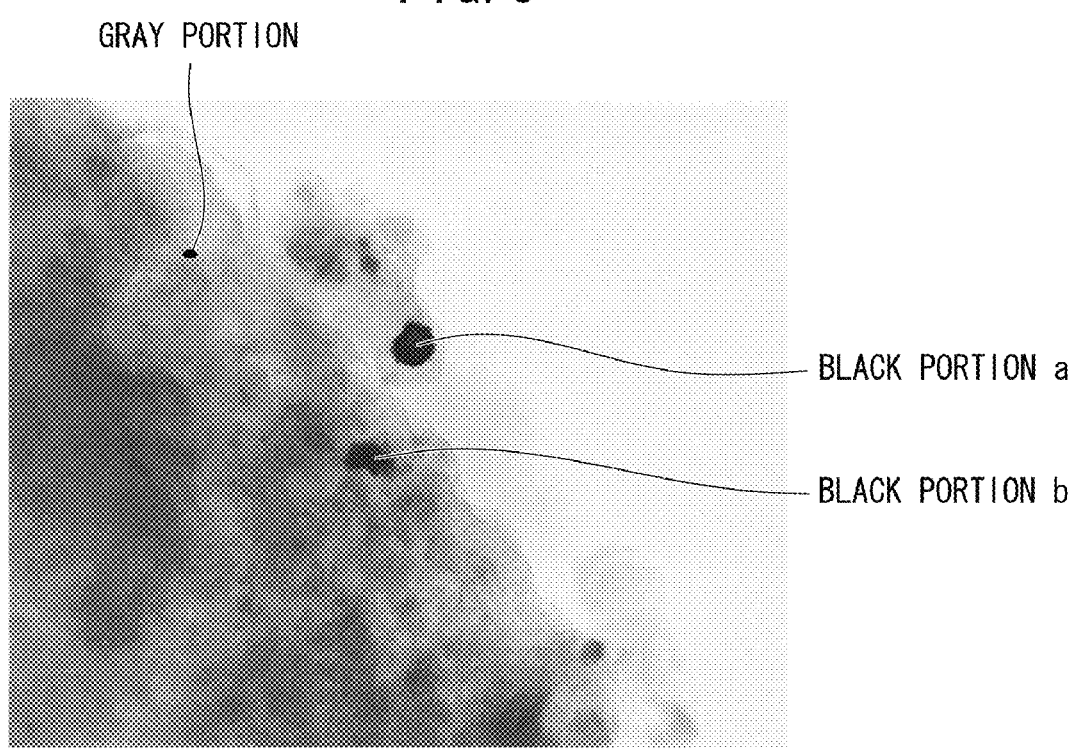
FIG. 6 is a TEM photograph of the hydrogen storage material shown in FIG. 5.

As shown in the schematic explanatory structure view of FIG. 5 and the TEM photograph of FIG. 6, a hydrogen storage material 18 according to another embodiment may contain, in addition to the mother phase 12 and the dispersed phases 14, metal particles 16 dispersed in the mother phase 12. Such a structure can be obtained by adding the metal particles 16 in the preparation of the mixed powder of the $AlH_3$ and $MgH_2$ and thereafter performing the ball milling under the above condition.

In this embodiment, the ratio between the $AlH_3$, $MgH_2$, and metal particles is not particularly limited. For example, the weight ratio of the $AlH_3$ to the total of the $MgH_2$ and the metal particles may be 55:45 through 95:5. In other words, the amount of the added metal particles may be equal to the reduction of the $MgH_2$. It should be noted that the ratio of the $MgH_2$ is higher than that of the metal particles.

Figure 7:
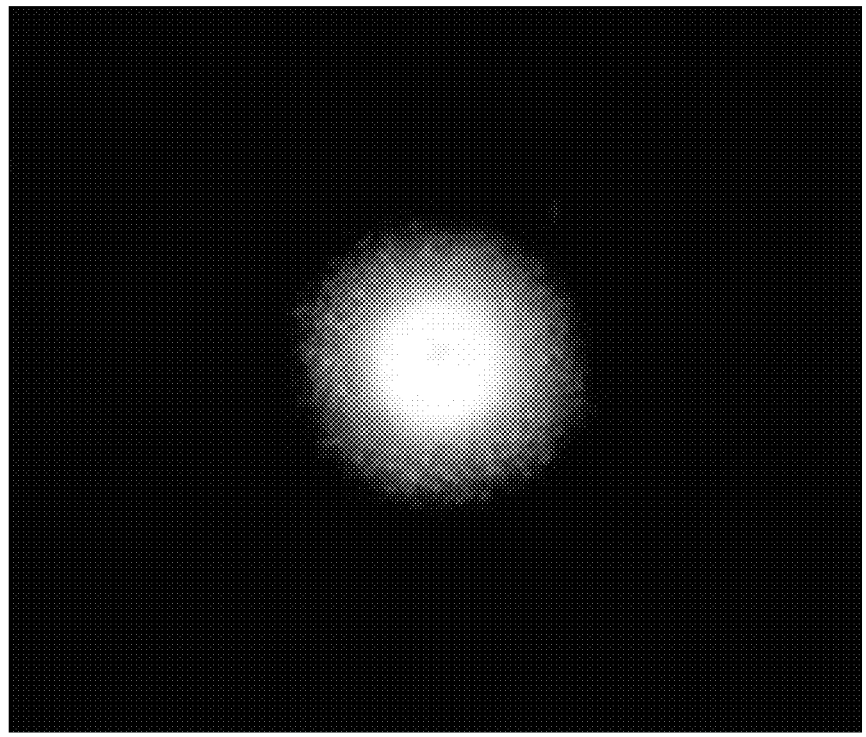
FIG. 7 is an electron beam diffraction image obtained by a selected-area analysis of a gray portion shown in FIG. 6.

FIG. 7 is an electron beam diffraction image obtained by a selected-area analysis of the mother phase 12 shown as a gray portion in FIG. 6. A halo pattern is shown in FIG. 7, so that the mother phase 12 is an amorphous phase also in this embodiment. Furthermore, in an energy dispersive X-ray spectroscopy (EDS), the presence of Al and Mg is confirmed in the gray portion.

Figure 8:
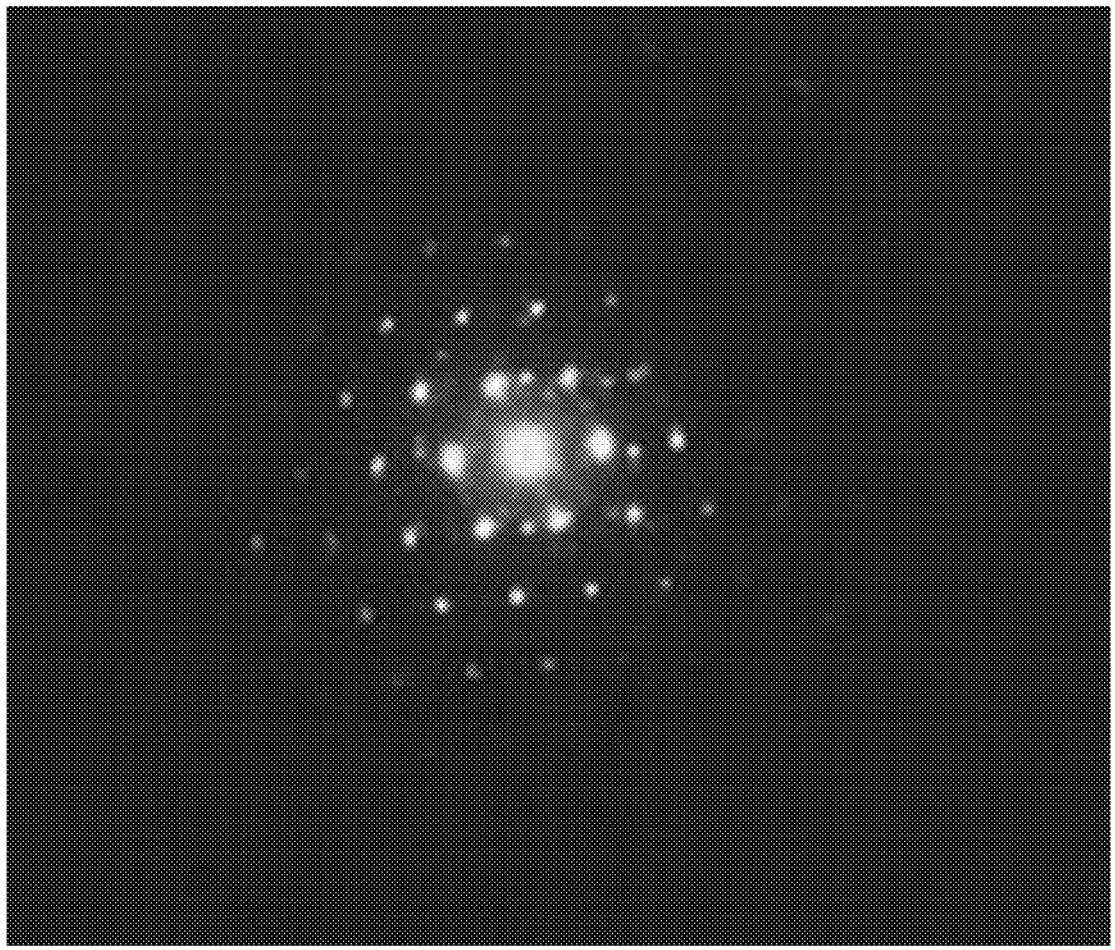
FIG. 8 is an electron beam diffraction image obtained by a selected-area analysis of a black portion a shown in FIG. 6.
Figure 9:
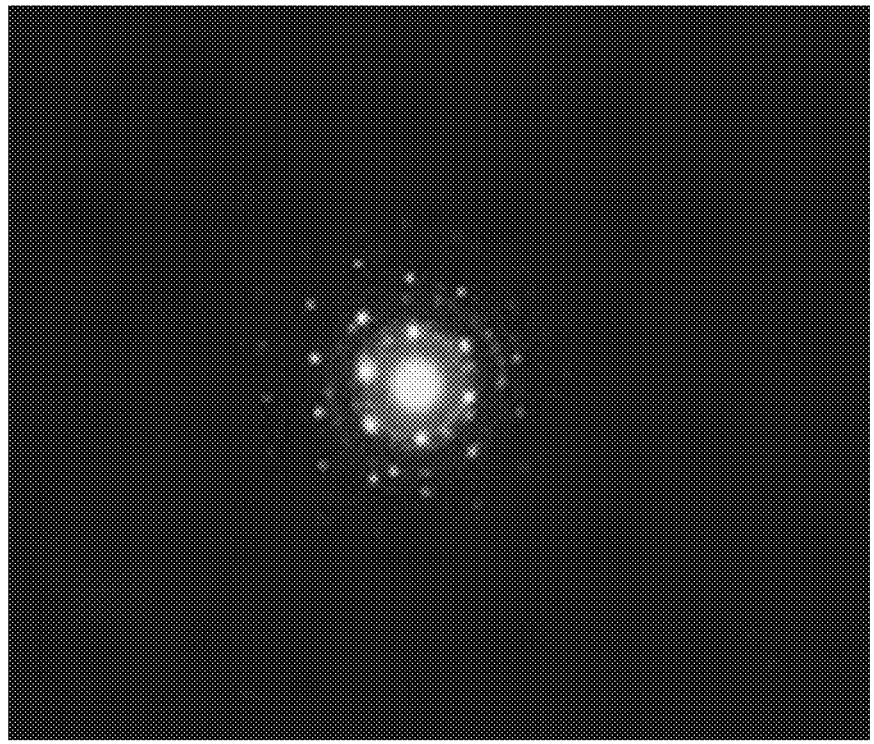
FIG. 9 is an electron beam diffraction image obtained by a selected-area analysis of a black portion b shown in FIG. 6.

On the other hand, as shown in FIGS. 8 and 9, in a selected-area analysis of each of black portions a and b shown in FIG. 6, a clear spot pattern is observed. Furthermore, in an EDS analysis of the black portion a shown in FIG. 8, the presence of Al is confirmed. In an EDS analysis of the black portion b shown in FIG. 9, the presence of the metal added in the form of the particles is confirmed.

The metal particles 16 are not particularly limited, and preferably contain Ni, Fe or Pd. This is because the metals can accelerate the adsorption of hydrogen molecules, the dissociation to hydrogen atoms, and the diffusion into the mother phase 12. The metals are excellent particularly in activity for dissociating the adsorbed hydrogen molecules to the hydrogen atoms. Furthermore, the metals can advantageously accelerate the formation of the amorphous phase of the Al—Mg alloy in the ball milling of the mixed powder of the $AlH_3$ and $MgH_2$.

Of course, two or more of Ni, Fe and Pd may be used together as the metal particles 16.

The metal particles 16 have a maximum diameter of 500 nm or less. When the maximum diameter is more than 500 nm, the activity of the metal particles 16 on the above described adsorption, dissociation and diffusion may be deteriorated.

The maximum diameter of the metal particles 16 may be 1 nm or more, because it is difficult to prepare the metal particles 16 with excessively small particle diameters. It is particularly preferred that the metal particles 16 have a maximum diameter of 1 through 100 nm from the viewpoints of availability and activity.

Example 1

13 g of $AlCl_3$ was added to and dissolved in 300 ml of a diethyl ether solution containing 1 mol/l of $LiAlH_4$, and was reacted at the ambient temperature until gas generation stopped. Then, LiCl precipitated in the solution was removed by filtration, and the filtrate was exposed to reduced pressure for 1 hour using a vacuum pump to evaporate diethyl ether. The residue was dried under reduced pressure for 1 hour at each of 40° C., 60° C. and 80° C., to obtain 2 g of a particulate synthetic product. The steps were repeated to prepare 6 g of $AlH_3$ particles in total.

0.8 g of the prepared $AlH_3$ particles were mixed with 0.2 g of $MgH_2$ in an agate mortar to prepare a mixed powder. In the mixed powder, the weight ratio of the $AlH_3$ to the $MgH_2$ was 8:2.

Figure 10:
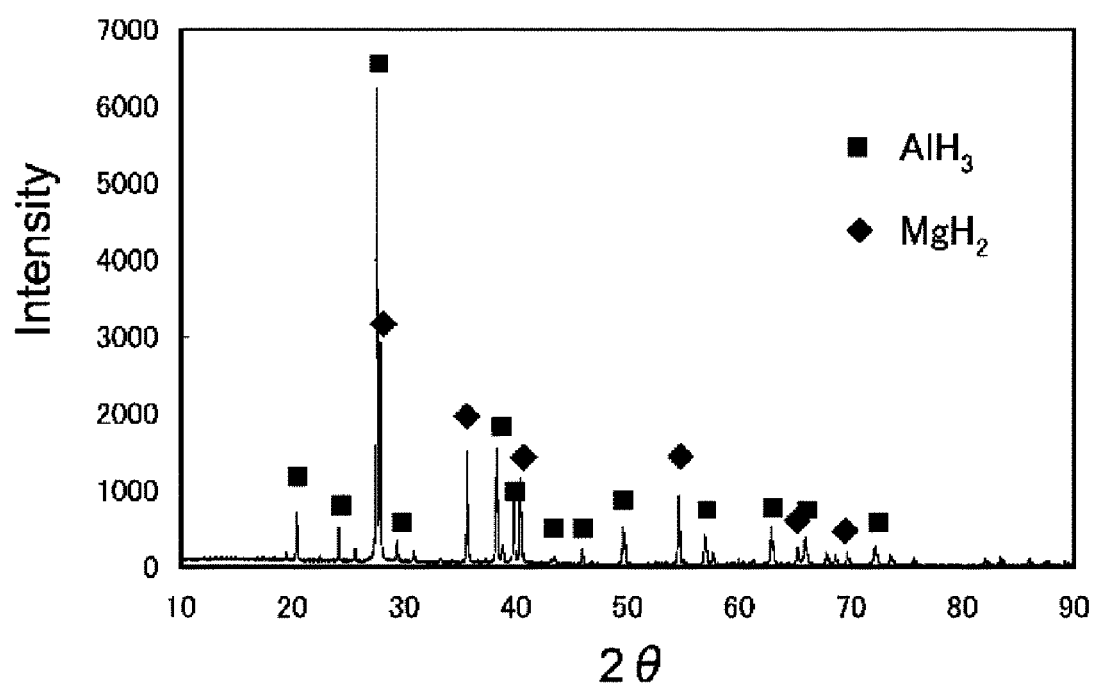
FIG. 10 is an X-ray diffraction pattern of a mixed powder of $AlH_3$ and $MgH_2$ prepared in Example 1.

FIG. 10 is an X-ray diffraction pattern of the mixed powder measured by using an X-ray diffractometer manufactured by Bruker. As shown in FIG. 10, peaks of $AlH_3$ and $MgH_2$ were observed.

The mixed powder was enclosed together with a crushing ball in a pot having an outer diameter of 80 mm, a height of 100 mm, and an internal volume of 80 ml. In this step, the enclosure was carried out in a hydrogen atmosphere, and hydrogen was introduced to the pot such that the internal hydrogen pressure of the pot was 1.5 MPa.

The pot was sandwiched between a rotatable table and a press shaft on a disc-shaped base plate of a planetary ball milling apparatus (manufactured by Fritsch, Germany), and subjected to ball milling. The disc-shaped base plate had a diameter of 300 mm, and the rotation speed thereof was 350 rpm. The rotation speed of the rotatable table (i.e. the speed of rotation of the pot on its axis) was 800 rpm, and the ball milling time was 300 minutes. A force of 16 G was applied to the mixed powder under the condition.

The ball-milled powder was dehydrogenated to produce a final product. The final product was subjected to an X-ray diffraction measurement using the above X-ray diffractometer. The X-ray diffraction pattern of the final product is shown in FIG. 11.

Figure 11:
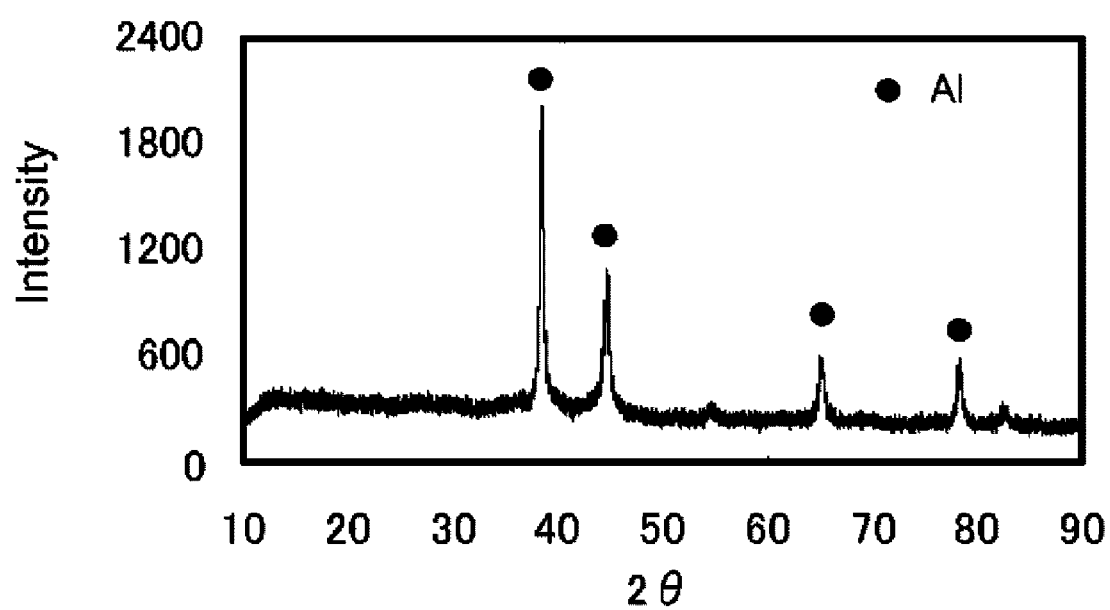
FIG. 11 is an X-ray diffraction pattern of a final product obtained in Example 1.

As a result, as shown in FIG. 11, only peaks of Al were observed, and peaks of Mg, $AlH_3$ and $MgH_2$ were not found. This means that a crystalline Mg, a crystalline Al—Mg alloy, $AlH_3$ and $MgH_2$ were not contained in the final product.

A TEM photograph of the final product is shown in FIG. 1. Incidentally, the acceleration voltage was 200 kV.

As described above, the electron beam diffraction image obtained by the selected-area analysis of the gray portion of FIG. 1 is shown in FIG. 2, and the electron beam diffraction image obtained by the selected-area analysis of the black portion is shown in FIG. 3. It is clear from FIGS. 2 and 3 that the gray portion (the mother phase) was an amorphous phase and the black portion (the dispersed phase) was a crystalline phase.

In an EDS analysis, the presence of Al and Mg was confirmed in the gray portion (the mother phase), and the presence of Al was confirmed in the black portion (the dispersed phase). It is clear from the results that the final product contained the crystalline Al phases (the dispersed phases) dispersed in the amorphous phase (the mother phase) containing the Al—Mg alloy.

Furthermore, TEM photographs of various areas of the final product were analyzed. The analysis showed that island-shaped crystalline Al phases (the dispersed phases) were distributed in the amorphous phase, and the maximum length of each of the crystalline Al phases, which was measured in two-dimensional plane, was generally within a range of 10 through 20 nm and was at most 100 nm or less.

Figure 12:
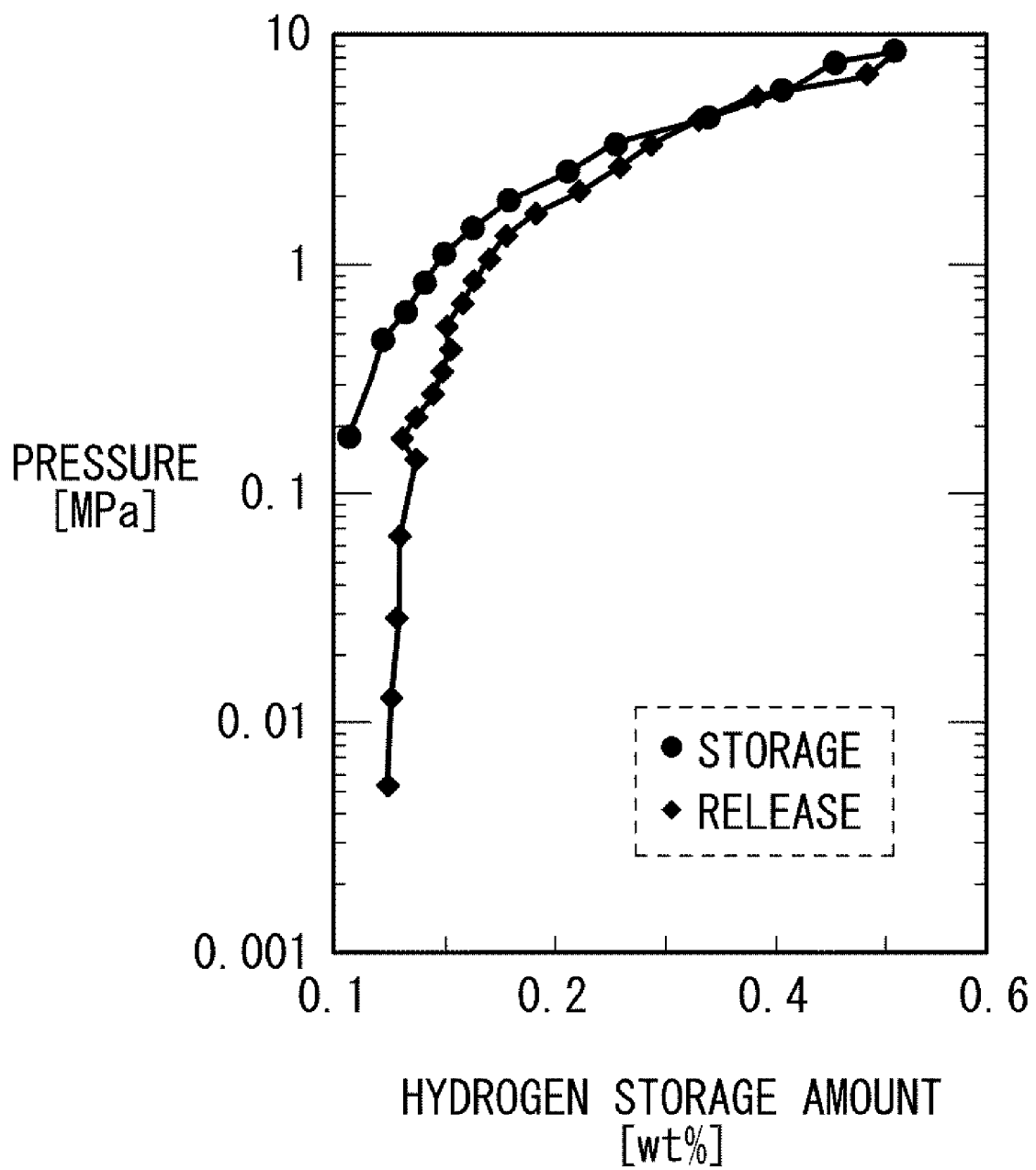
FIG. 12 is a graph showing results of a hydrogen storage/release measurement (PCI measurement) of the final product.

Then, 0.3 g of the final product was subjected to a hydrogen storage/release measurement (a PCT measurement) under a hydrogen pressure ranging from vacuum through 10 MPa and a temperature of 100° C. The results are shown in FIG. 12. It is clear from FIG. 12 that the final product stored about 0.41% by weight of hydrogen at a relatively low pressure of 9 MPa.

The hydrogen was stored again (re-stored) at a low pressure, the amount of the re-stored hydrogen is increased with increasing pressure, and a plateau was not formed. Therefore, it is presumed that the hydrogen storage was caused by formation of solid solution of hydrogen in the amorphous phase (the mother phase), not by formation of $AlH_3$.

Furthermore, as shown in FIG. 12, the final product can store hydrogen even under a hydrogen pressure of approximately 10 MPa (100 atm) and a temperature of approximately 100° C. and can release hydrogen under the same condition. It is clear from the results that the final product is an excellent hydrogen storage material capable of reversibly storing and releasing hydrogen.

Example 2

0.7 g of the $AlH_3$ particles prepared in Example 1 were mixed with 0.25 g of $MgH_2$ and 0.05 g of fine Ni particles having a maximum diameter of 100 nm or less in an agate mortar to prepare a mixed powder. In the mixed powder, the weight ratio of $AlH_3$:$MgH_2$:Ni was 7:2.5:0.5.

Figure 13:
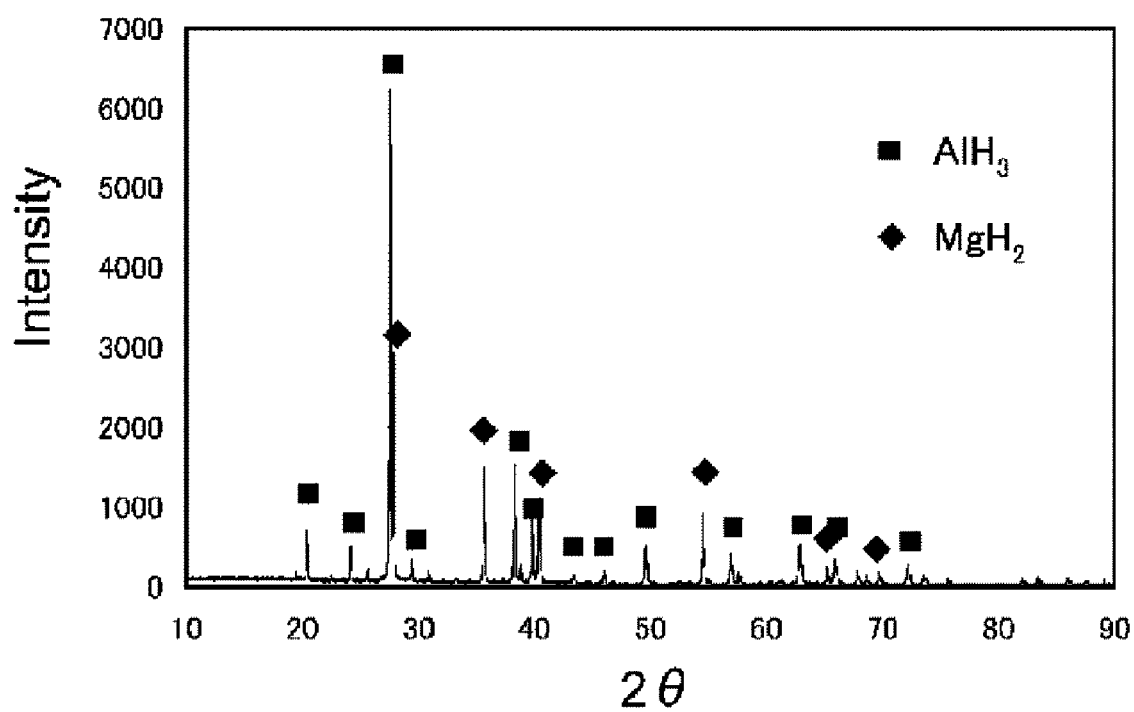
FIG. 13 is an X-ray diffraction pattern of a mixed powder of $AlH_3$ and $MgH_2$ prepared in Example 2.

FIG. 13 is an X-ray diffraction pattern of the mixed powder measured by using the above X-ray diffractometer. As shown in FIG. 13, peaks of $AlH_3$ and $MgH_2$ were observed.

Figure 14:
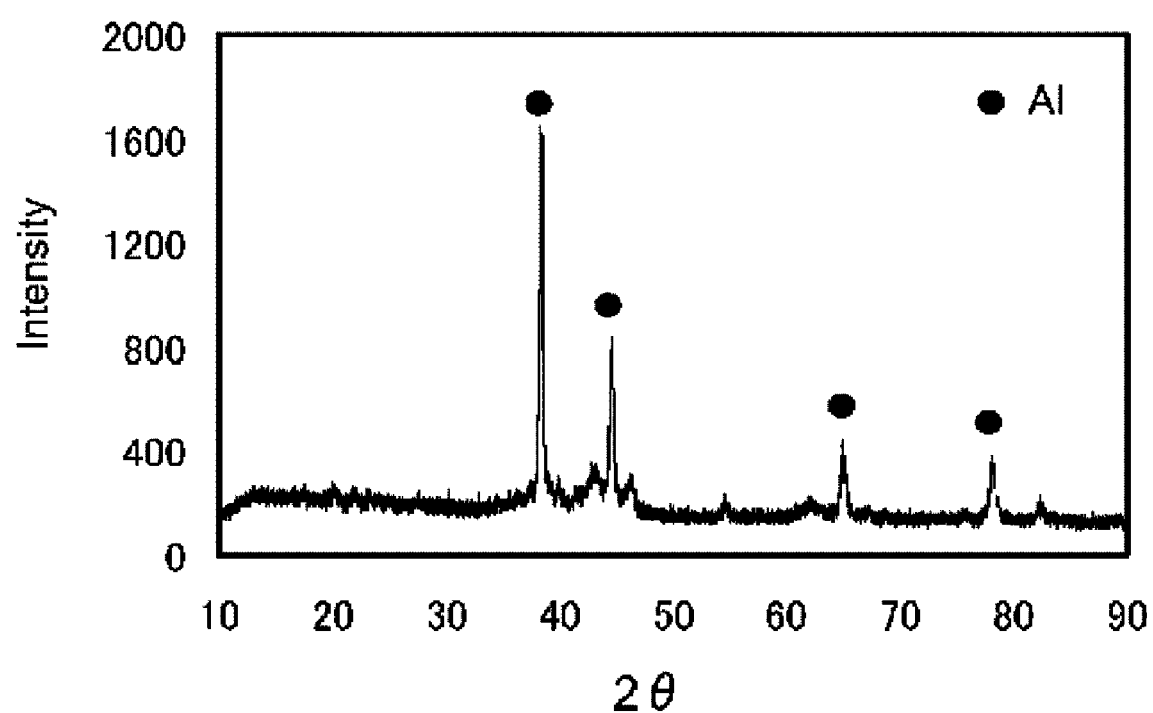
FIG. 14 is an X-ray diffraction pattern of a final product obtained in Example 2.

Then, a final product of Example 2 was produced by subjecting the mixed powder to the ball milling process and dehydrogenation treatment in the same manner as Example 1. The X-ray diffraction pattern of the final product is shown in FIG. 14. As a result, also in this example, only peaks of Al were observed, and peaks of Mg, Ni, $AlH_3$ and $MgH_2$ were not found. This means that a crystalline Mg, a crystalline Ni, a crystalline Al—Mg alloy, $AlH_3$ and $MgH_2$ were not contained in the final product.

A TEM photograph of the final product is shown in FIG. 6. Incidentally, the acceleration voltage was 200 kV in the same manner as above.

As described above, the electron beam diffraction image obtained by the selected-area analysis of the gray portion of FIG. 6 is shown in FIG. 7, the electron beam diffraction images obtained by the selected-area analysis of the black portions a and b are shown in FIGS. 8 and 9. It is clear from FIGS. 7 to 9 that the gray portion (the mother phase) was an amorphous phase, and the black portion a (the dispersed phase) and the black portion b (the metal particle) were crystalline.

In an EDS analysis, the presence of Al and Mg was confirmed in the gray portion (the mother phase), the presence of Al was confirmed in the black portion a (the dispersed phase), and the presence of Ni was confirmed in the black portion b (the metal particle). It is clear from the results that the final product contained the crystalline Al phases (the dispersed phases) and the fine Ni particles (the metal particles) dispersed in the amorphous phase (the mother phase) containing the Al—Mg alloy.

Furthermore, TEM photographs of various areas of the final product were analyzed. The analysis showed that island-shaped crystalline Al phases (the dispersed phases) were distributed in the amorphous phase, and the maximum length of each of the crystalline Al phases, which was measured in two-dimensional plane, was generally within a range of 10 through 20 nm and was at most 100 nm or less. The diameters of the fine Ni particles in the final product were approximately equal to the diameters before the addition.

Figure 15:
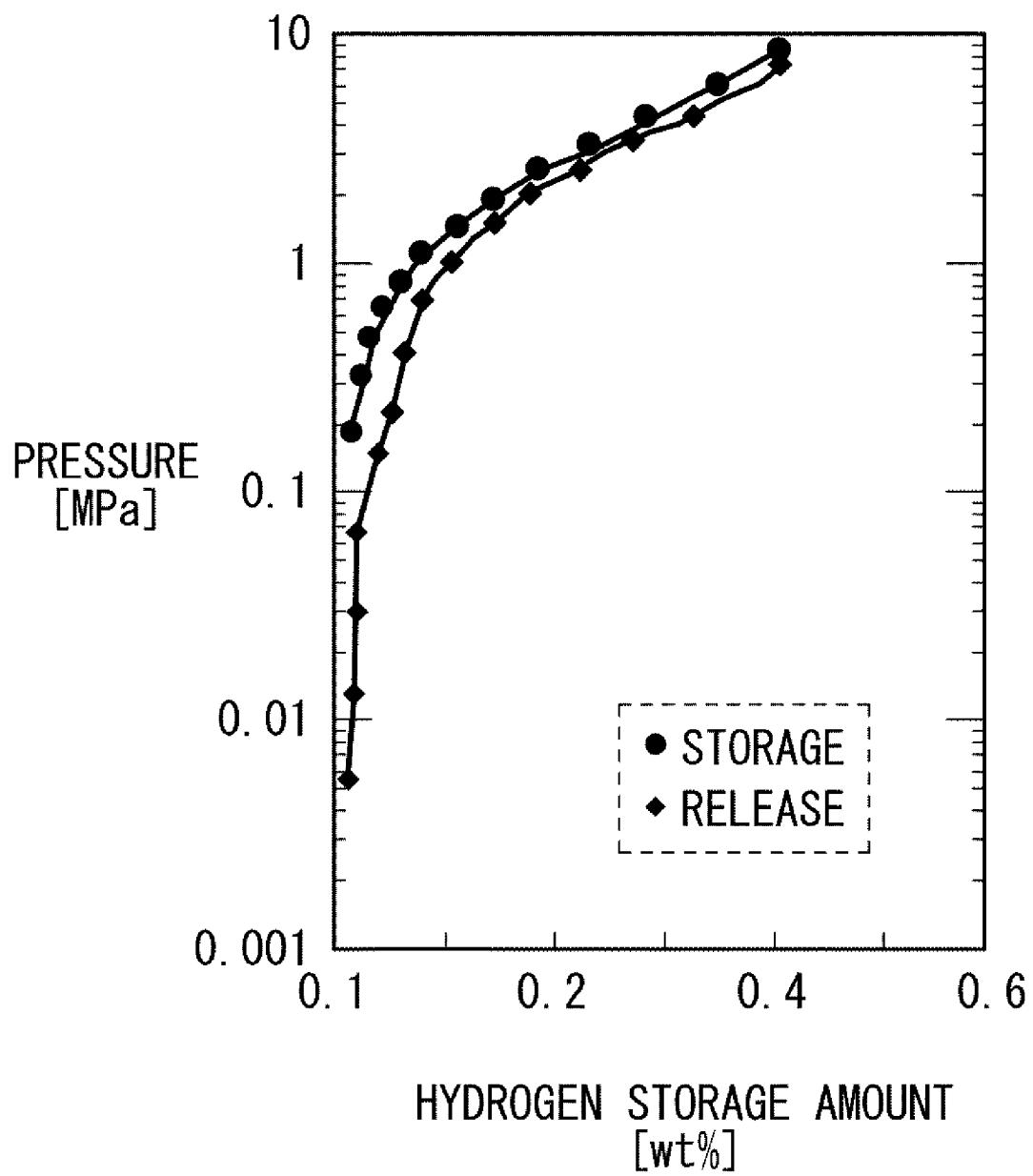
FIG. 15 is a graph showing results of a PCT measurement of the final product.

Then, 0.3 g of the final product was subjected to a PCT measurement under a hydrogen pressure ranging from vacuum through 10 MPa and a temperature of 100° C. The results are shown in FIG. 15. It is clear from FIG. 15 that the final product stored a relatively large amount (about 0.52% by weight) of hydrogen at a relatively low pressure of 9 MPa. Thus, the hydrogen storage amount can be further increased by dispersing the fine Ni particles in the mother phase.

In Example 2, as wells as in Example 1, the hydrogen was stored again (re-stored) at a low pressure, the amount of the re-stored hydrogen is increased with increasing pressure, and a plateau was not formed. Therefore, it is presumed that the hydrogen storage was caused by formation of solid solution of hydrogen in the amorphous phase (the mother phase), not by formation of $AlH_3$.

Furthermore, as shown in FIG. 15, the final product can store hydrogen even under a hydrogen pressure of approximately 10 MPa (100 atm) and a temperature of approximately 100° C. and can release hydrogen under the same condition. It is clear from the results that the final product is an excellent hydrogen storage material capable of reversibly storing and releasing hydrogen.

Although certain preferred embodiments of the present invention have been shown and described in detail, it should be understood that various changes and modifications may be made therein without departing from the scope of the appended claims.

What is claimed is:

1. A hydrogen storage material capable of reversibly storing and releasing hydrogen, comprising:
    an amorphous phase containing an Al—Mg alloy; and
    a crystalline Al phase having a maximum length of 100 nm or less and dispersed in the amorphous phase.

2. The hydrogen storage material according to claim 1, further comprising a metal particle having a maximum diameter of 500 nm or less and dispersed in the amorphous phase.

3. The hydrogen storage material according to claim 2, wherein the metal particle contains Ni, Fe, Pd or two or more thereof.

4. A method for producing a hydrogen storage material comprising an amorphous phase containing an Al—Mg alloy and a crystalline Al phase having a maximum length of 100 nm or less, the crystalline Al phase being dispersed in the amorphous phase, the method comprising the steps of:
    mixing $AlH_3$ and $MgH_2$ to prepare a mixed powder;
    ball-milling the mixed powder in a hydrogen atmosphere for 60 through 600 minutes while applying force of 5 G through 30 G (in which G is gravitational acceleration) to prepare a milled product; and
    dehydrogenating the milled product to obtain the hydrogen storage material.

5. The method according to claim 4, wherein the weight ratio of the $AlH_3$ to the $MgH_2$ is 55:45 through 95:5 in the mixing step.

6. The method according to claim 4, wherein a metal particle having a maximum diameter of 500 nm or less is further added to the $AlH_3$ and the $MgH_2$ in the mixing step.

7. The method according to claim 6, wherein the metal particle contains Ni, Fe, Pd or two or more thereof.

8. The method according to claim 6, wherein the weight ratio of the $AlH_3$ to the total of the $MgH_2$ and the metal particle is 55:45 through 95:5 in the mixing step.

* * * * *